(12) United States Patent
Sauder et al.

(10) Patent No.: US 8,631,749 B2
(45) Date of Patent: Jan. 21, 2014

(54) SEED TUBE EGRESS-MOUNTED SEED SENSOR

(75) Inventors: Gregg A. Sauder, Tremont, IL (US); Louis Gino Plantamura, Peoria, IL (US)

(73) Assignee: Precision Planting LLC, Tremont, IL (US)

( * ) Notice: Subject to any disclaimer, the term of this patent is extended or adjusted under 35 U.S.C. 154(b) by 217 days.

(21) Appl. No.: 12/984,263

(22) Filed: Jan. 4, 2011

(65) Prior Publication Data
US 2012/0169353 A1 Jul. 5, 2012

(51) Int. Cl.
*A01C 7/08* (2006.01)

(52) U.S. Cl.
USPC ............ 111/200; 111/900; 111/903; 340/684

(58) Field of Classification Search
USPC ................. 111/903, 904, 900, 200; 340/684; 701/50
See application file for complete search history.

(56) References Cited

U.S. PATENT DOCUMENTS

| | | | |
|---|---|---|---|
| 2,864,963 A | 12/1958 | Dornstreich et al. | |
| 4,009,799 A | 3/1977 | Fathauer | |
| 4,149,163 A | 4/1979 | Fathauer | |
| 4,163,507 A | 8/1979 | Bell | |
| 4,164,669 A | 8/1979 | Knepler | |
| 4,239,010 A | 12/1980 | Amburn | |
| 4,246,469 A | 1/1981 | Merlo | |
| 4,268,825 A | 5/1981 | Kaplan | |
| 4,782,282 A * | 11/1988 | Bachman | 324/668 |
| 5,301,848 A | 4/1994 | Conrad et al. | |
| 5,635,911 A | 6/1997 | Landers et al. | |
| 6,116,172 A | 9/2000 | Prairie et al. | |
| 6,208,255 B1 * | 3/2001 | Conrad et al. | 340/606 |
| 6,332,413 B1 * | 12/2001 | Stufflebeam et al. | 111/170 |
| 6,346,888 B1 | 2/2002 | Conrad et al. | |
| 6,535,115 B1 | 3/2003 | Barth et al. | |
| 6,608,811 B1 | 8/2003 | Holden et al. | |
| 6,643,105 B2 | 11/2003 | Nakamoto et al. | |
| 6,644,223 B2 | 11/2003 | Prairie et al. | |
| 6,937,434 B2 | 8/2005 | Takahashi | |
| 7,086,269 B2 | 8/2006 | Sauder et al. | |
| 7,152,540 B1 | 12/2006 | Sauder | |
| 7,202,593 B2 | 4/2007 | Matsuoka et al. | |
| 7,426,894 B2 | 9/2008 | Peterson et al. | |
| 7,584,707 B2 | 9/2009 | Sauder et al. | |

FOREIGN PATENT DOCUMENTS

| | | |
|---|---|---|
| CA | 1081822 | 7/1980 |
| GB | 1506651 | 4/1978 |

OTHER PUBLICATIONS

Declaration of Gregg A. Sauder with Exhibit A (6 pages).

* cited by examiner

*Primary Examiner* — Christopher J Novosad
(74) *Attorney, Agent, or Firm* — Thomas J. Oppold; Larkin Hoffman Daly & Lindgren Ltd.

(57) ABSTRACT

A seed sensor for an agricultural planter adapted to be disposed proximate an egress end of a seed tube through which seeds pass during planting operations. The seed sensor capable of generating an output signal corresponding to the passage of seed therethrough.

21 Claims, 9 Drawing Sheets

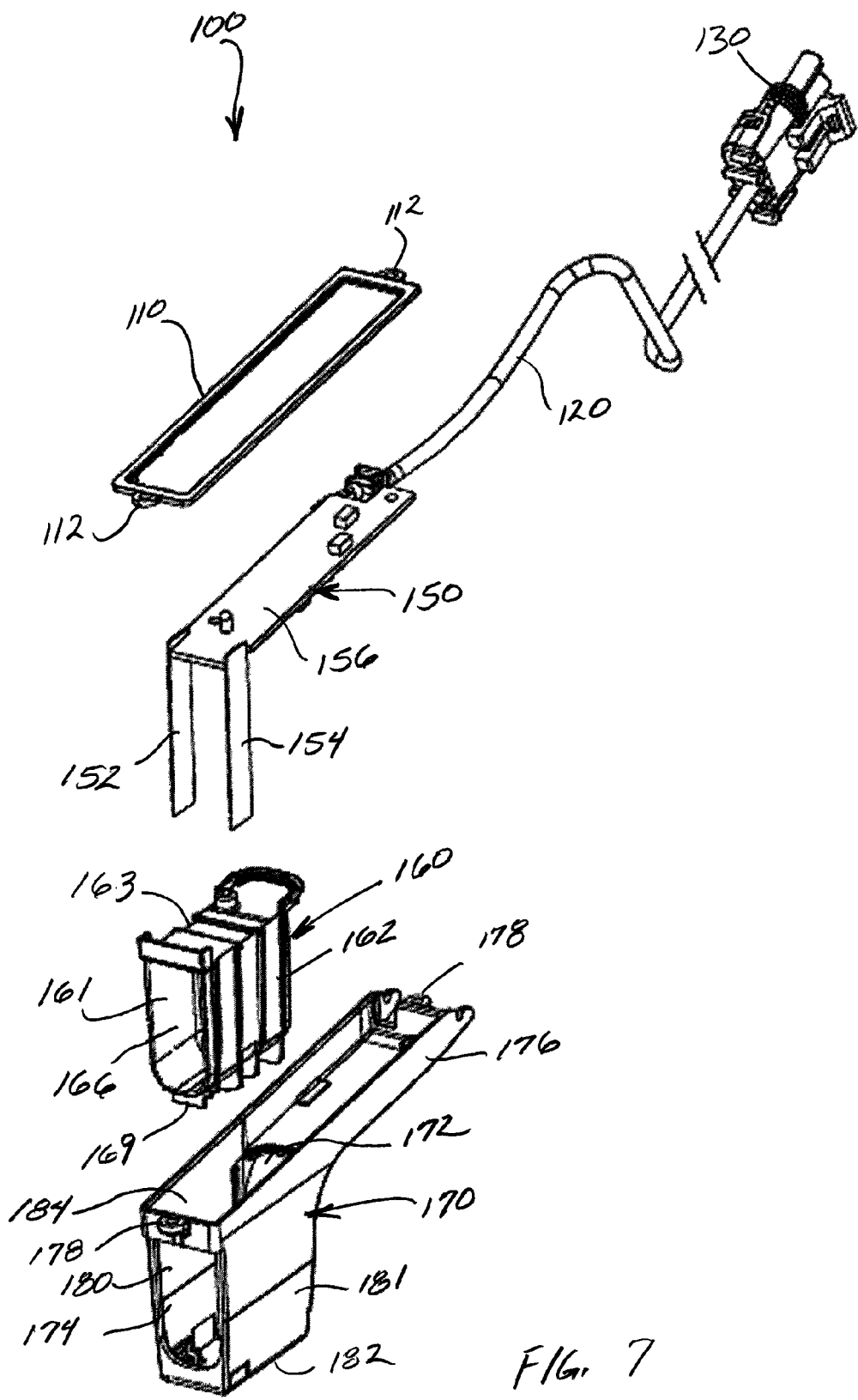

SEED TUBE EGRESS-MOUNTED SEED SENSOR

BACKGROUND

In conventional planters, seed sensors are employed to detect the passage of seed through the seed tube. There are various types of sensors suitable for detecting seeds passing through a seed tube, but the most common sensor is a photoelectric or optical sensor, such as the type distributed by Dickey-John Corporation of Auburn, Ill. As disclosed in U.S. Pat. No. 7,152,540 ("the '540 patent"), incorporated herein by reference, photoelectric seed sensors generally include a light source element and a light receiving element or detector disposed over apertures in the forward and rearward walls of the seed tube. When a seed passes between the light source and the detector, the seed interrupts the light beam. When the light beam is interrupted a signal pulse is generated indicating the passage of a seed. The generated signal pulse is communicated to the planter monitor (not shown). The planter monitor counts the signal pulses for purposes of determining seed count or population as well as monitoring the time between signal pulses for purposes of determining seed spacing. In addition to determining seed count and seed spacing, if the time interval between generated signal pulses exceeds a predefined time period, the monitor is typically configured to provide an audible and/or visual alarm to indicate to the operator that there is a problem with the particular row unit, such as the seed hopper running empty or a malfunction of the seed meter or the sensor.

In conventional planters the seed sensors are mounted near the midpoint of the seed tube to protect the sensor from damage during planting operations as well as to minimize ambient light, dust and particulate matter interfering with the light beam. However, it is well known that by the time the seeds pass through the seed tube before being deposited into the seed furrow, the actual in-furrow seed-to-seed spacing can vary dramatically from the seed-to-seed spacing detected by the seed sensor at the midpoint of the seed tube. This is due to the fact that no matter how uniformly spaced the seed meter may dispense sequential seeds into the seed tube, seed ricochet within the seed tube as the seed passes through the tube can significantly affect the velocities of the seeds as they exit the tube.

Seed ricochet off the sidewalls of the seed tube may be caused by the seed not entering the seed tube at the proper location, or due to irregularities or obstructions along the path of travel of the seed within the seed tube, or due to changes in vertical accelerations caused by the row unit encountering dirt clods, crop residue, rocks or changes in terrain as the planter traverses the field. If one seed ricochets more or less than an adjacent seed as it passes through the seed tube, it can result in significant irregularities or differences in the spatial placement between adjacent seeds within the furrow. For example, if one seed ricochets off the sidewalls of the seed tube three times before exiting the seed tube versus a seed that does not ricochet at all, or a seed that only ricochets once or twice, seeds experiencing more ricochet will exit the seed tube at a slower velocity than those experiencing fewer ricochets. This difference in seed velocity upon exiting the seed tube results in inconsistent seed-to-seed spacing in the furrow.

Thus, to more accurately reflect the actual in-furrow seed-to-seed placement, ideally the seed sensor should be placed at or near the bottom of the seed tube. However, for the reasons identified above, an optical sensor would be rendered nonfunctional if it was positioned at or near the end of the seed tube because the ambient light, dust and particulate matter would interfere with the light beam. Accordingly, there is a need for a seed sensor that can be mounted at or near the bottom or egress end of the seed tube and which can withstand the environmental conditions at such a location while still accurately detecting the passage of seeds as they exit or are about to exit the seed tube.

DESCRIPTION OF THE DRAWINGS

FIG. 7 is an exploded perspective view of the embodiment of the electromagnetic energy sensor of FIG. 3.

DESCRIPTION

Figure 1:
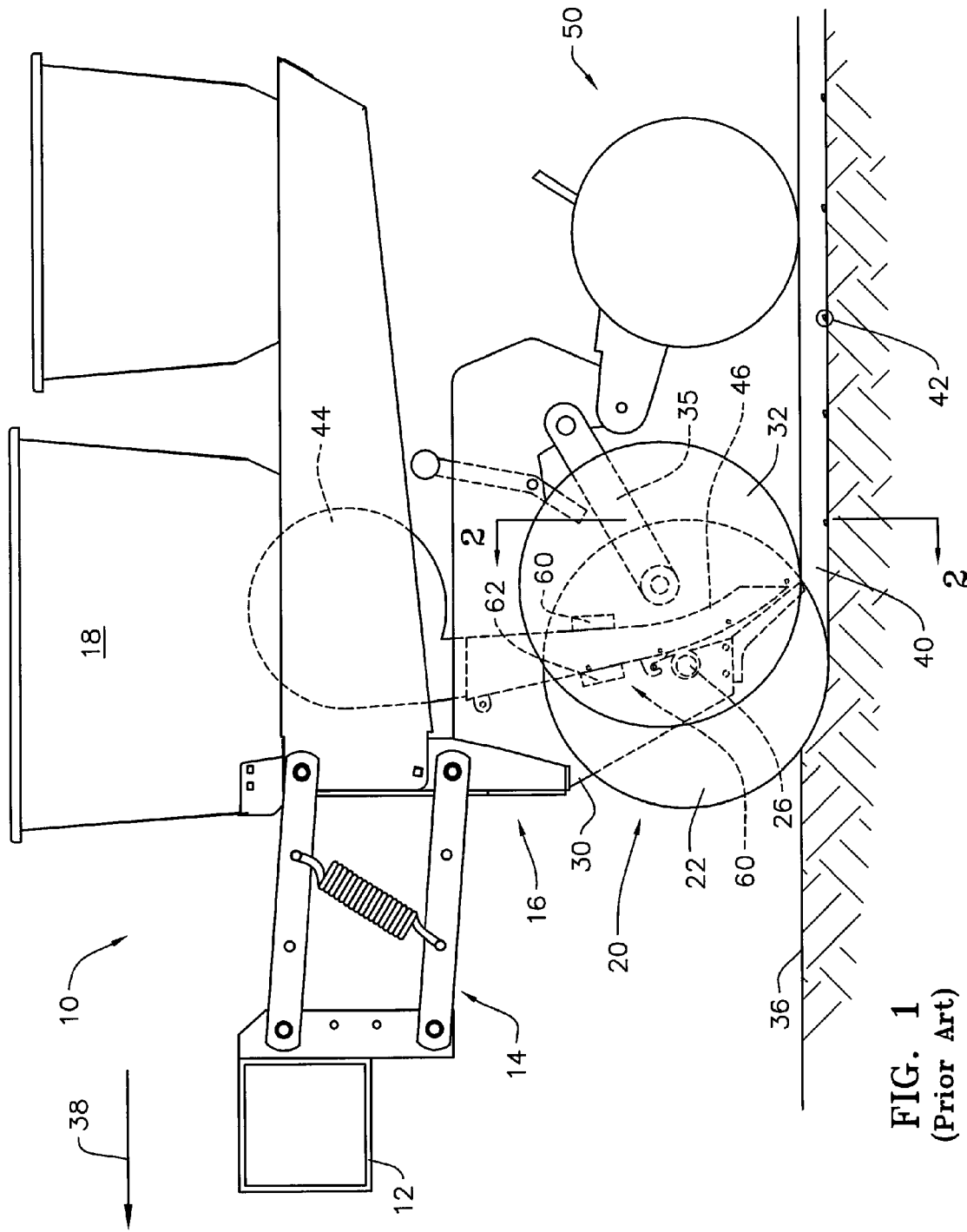
FIG. 1 illustrates a conventional row unit with a conventional seed sensor mounted in a conventional manner at about the midpoint of the seed tube.

Referring now to the drawings, wherein like reference numerals designate identical or corresponding parts throughout the several views, FIG. 1 illustrates a single row unit 10 of a conventional row crop planter. As is well known in the art, the row units 10 are mounted in spaced relation along the length of a transverse toolbar 12 by a parallel linkage 14 which permits each row unit 10 to move vertically independently of the toolbar and the other spaced row units in order to accommodate changes in terrain or upon the row unit encountering a rock or other obstruction as the planter is drawn through the field. Each row unit 10 includes a frame 16 which operably supports a seed hopper 18, a furrow opening assembly 20, a seed meter 44, a seed tube 46 and a furrow closing assembly 50.

Figure 2:
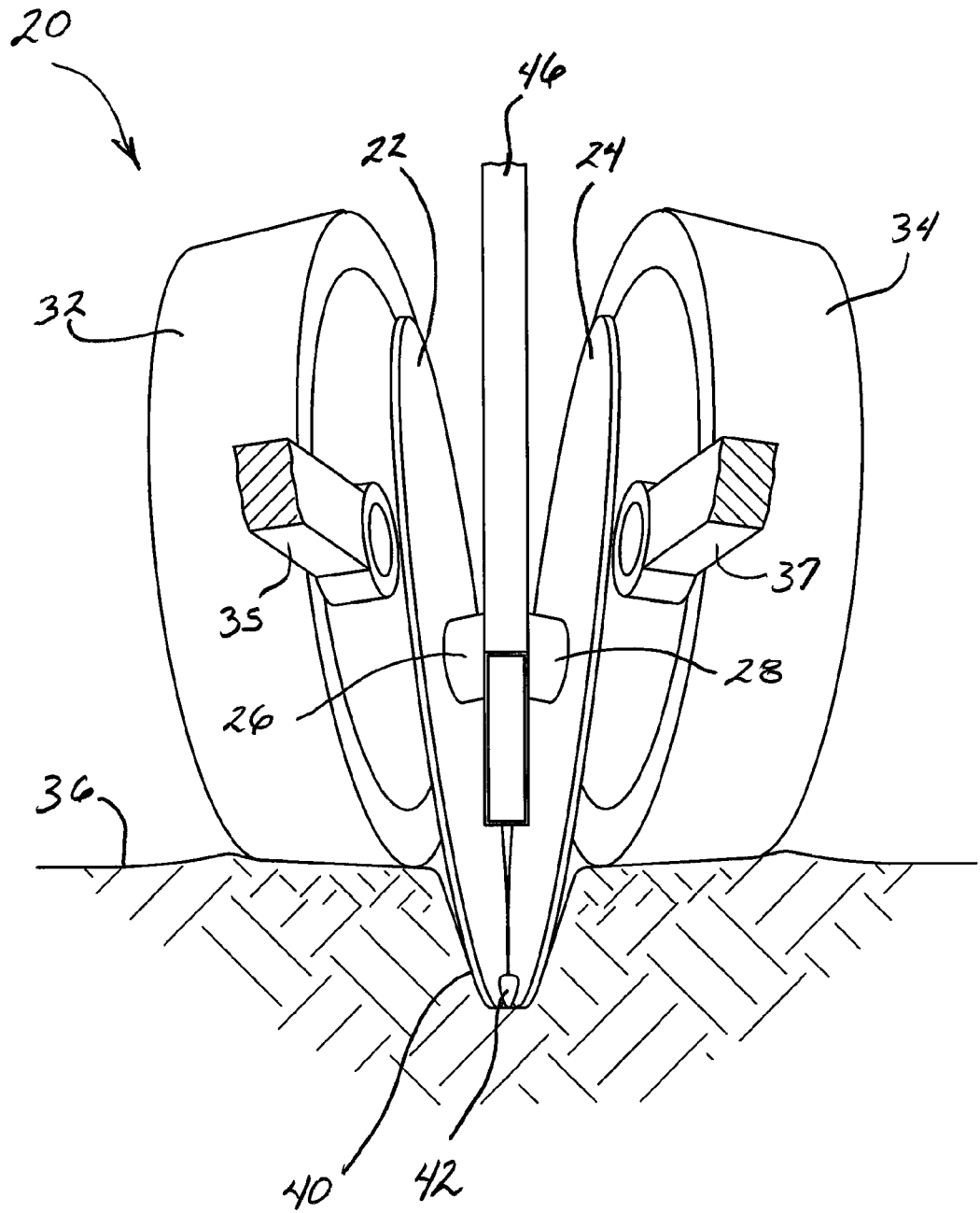
FIG. 2 is a partial rear elevation view of the row unit of FIG. 1 as viewed along lines 2-2 showing the furrow opening discs in relation to the seed tube.

The furrow opening assembly 20 comprises a pair of furrow opening discs 22, 24 which are rotatably mounted on shafts 26, 28 secured to a shank 30 comprising a part of the row unit frame 16. The furrow opening assembly 20 further comprises a pair of gauge wheels 32, 34 rotatably supported by gauge wheel arms 35, 37 also secured to the frame 16. As best illustrated in FIG. 2, which shows the furrow opening assembly 20 as viewed along lines 2-2 of FIG. 1, the discs 22, 24 are canted at an angle such that their outer peripheries come in close contact at the point of entry into the soil 36 and diverge outwardly and upwardly away from the direction of travel of the planter as indicated by arrow 38. Thus as the planter is drawn through the field, the rotating discs 22, 24 cut a V-shaped furrow 40 through the soil surface. The egress end of the seed tube 46 is disposed between the rearwardly diverging furrow opening discs 22, 24.

In operation, as the planter is drawn through the field, the seed hopper 18 communicates a constant supply of seeds 42 to the seed meter 44. The seed meter 44 meters or dispenses individual seeds 42 at regularly spaced intervals into the seed tube 46. The seed tube 46 directs the seeds downwardly and rearwardly between the diverging furrow opening discs 22, 24 before depositing the seeds into the V-shaped furrow 40. The seeds are then covered with soil by the furrow closing assembly 50. A conventional optical seed sensor 60, comprising a light source 62 and a light detector 64 is shown mounted at the conventional location at about the midpoint of the seed tube 46.

Figure 3:
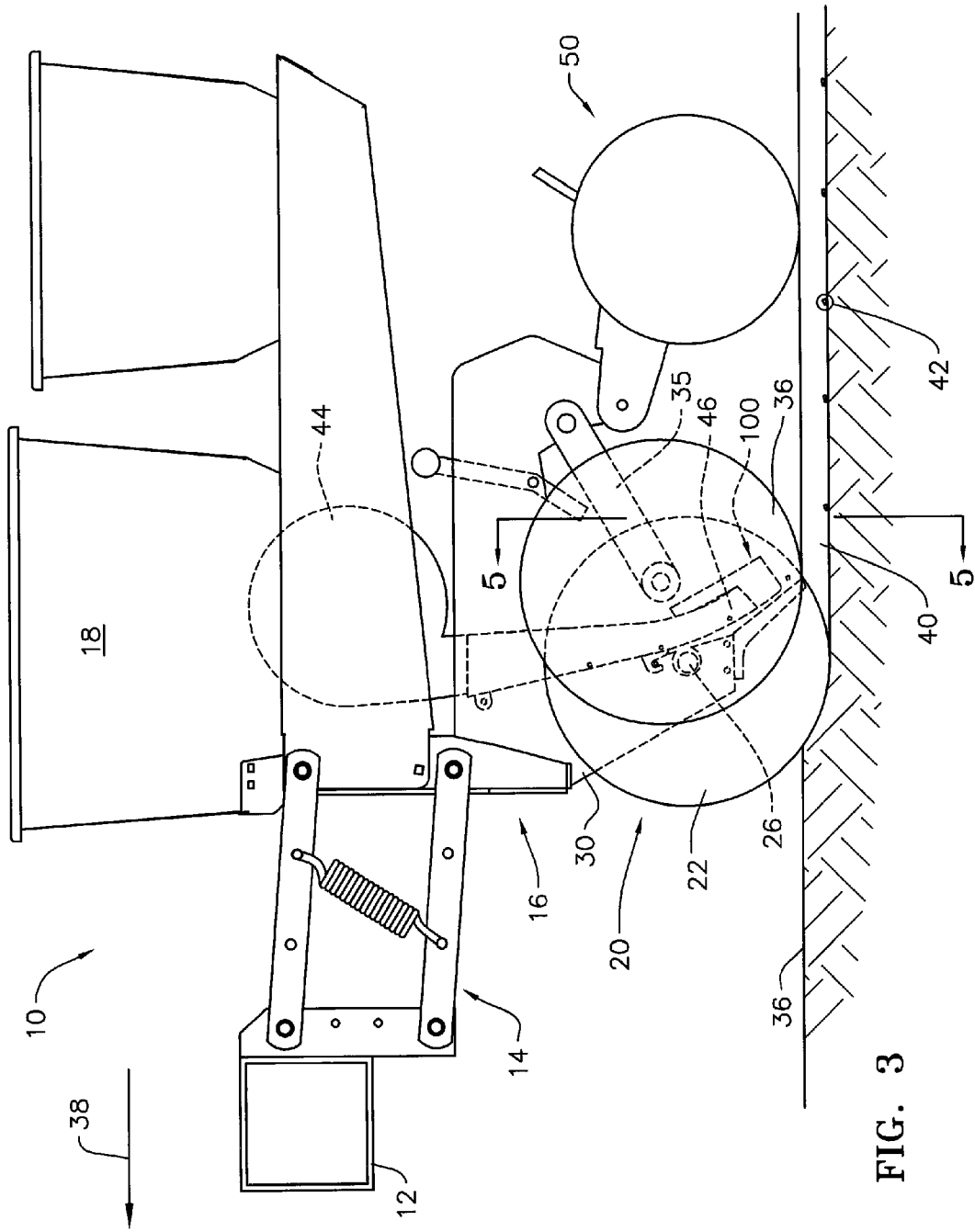
FIG. 3 illustrates a conventional row unit with an embodiment of an electromagnetic seed sensor mounted to a conventional seed tube at or near the bottom end of the seed tube.
Figures 4A, 4B, 4C:
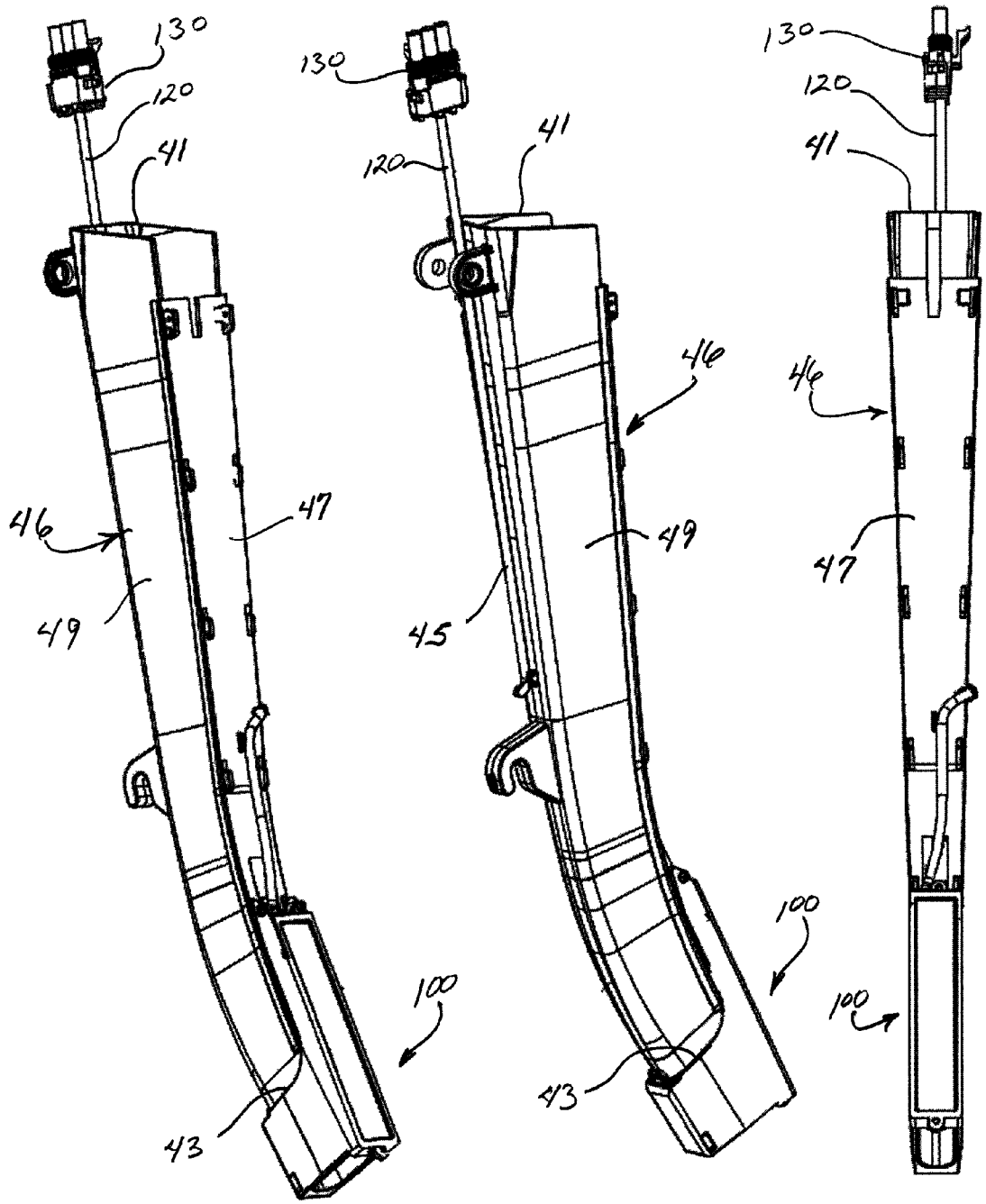
FIGS. 4A-4C illustrate various views of the electromagnetic seed sensor of FIG. 3 mounted at or near the bottom end of a conventional seed tube.
Figure 5:
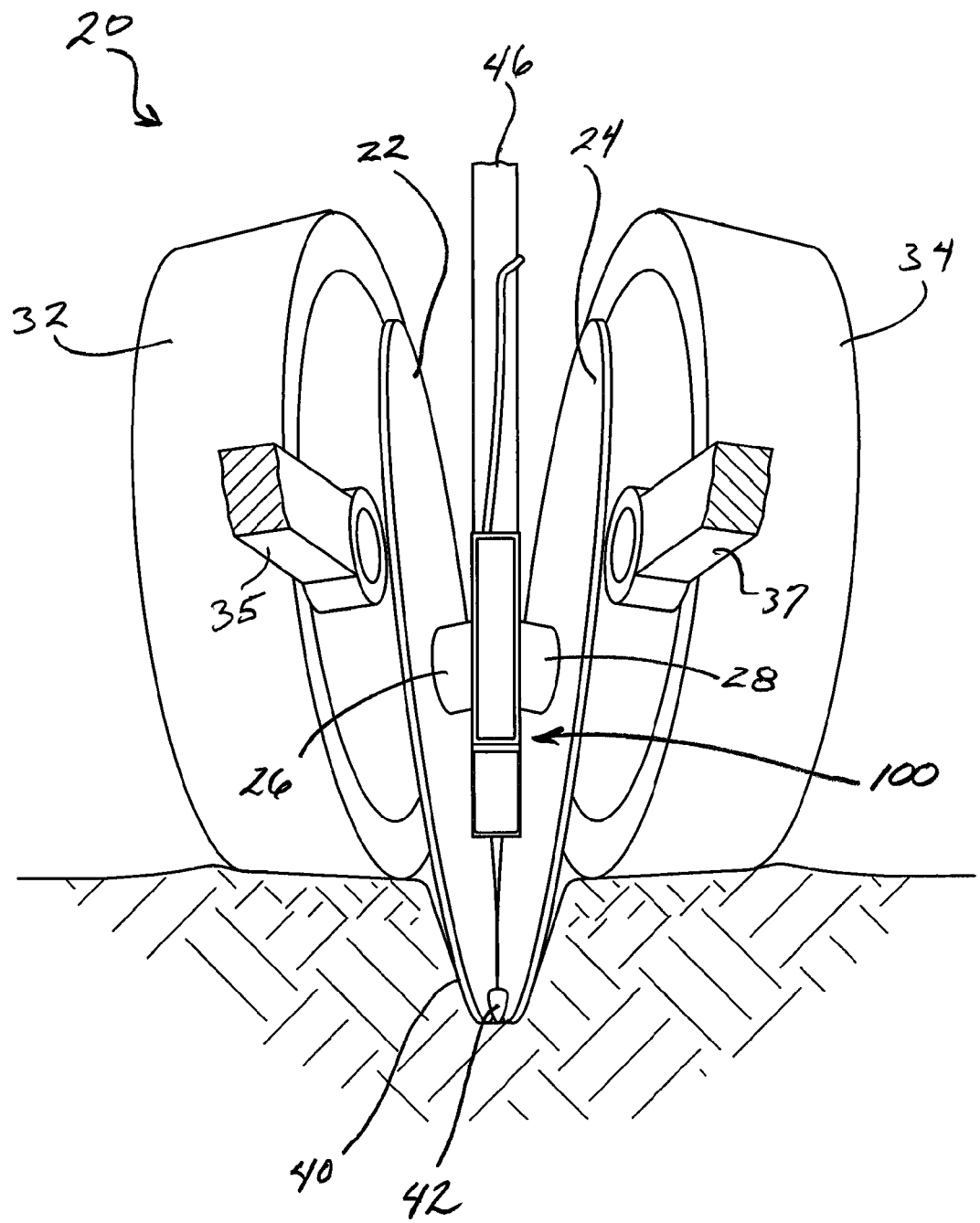
FIG. 5 is a partial rear elevation view of the row unit of FIG. 3 as viewed along lines 5-5 showing the furrow opening discs in relation to the seed tube and electromagnetic seed sensor mounted thereon.

FIG. 3 illustrates the same row unit 10 as in FIG. 1, but with the conventional optical seed sensor 60 replaced with an embodiment of an electromagnetic energy sensor 100 for detecting the passage of seeds (hereinafter "the sensor 100"). The sensor 100 preferably operates under the principals as described in U.S. Pat. Nos. 6,208,255 and 6,346,888 (hereinafter "the '255 and '888 patents"), both of which are incorporated herein in their entireties by reference, and is preferably substantially in accordance with the sensors disclosed therein.

As best shown in FIGS. 4A-4C and 5-6 the sensor 100 is preferably mounted at or near the bottom end of the seed tube 46 and is preferably sized and configured so that when mounted to the end of the seed on the planter it will fit between the furrow opening discs 22, 24 and will ride just above the soil surface during planting operations.

The preferred configuration of the sensor 100 in relation to the seed tube 46 is best illustrated in FIGS. 4A-4C and 6. It should be appreciated that the seed tube 46 may be any conventional or later developed seed tube and that the present invention is not limited to any particular shape or configuration of a seed tube. As illustrated, the seed tube 46 includes a rearwardly curving front wall 45 and rear wall 47 and opposing side walls 49 which together define a rearwardly curving passageway. Seeds dispensed by the seed meter 44 enter the open top end 41 of the seed tube 46 and are guided or directed downwardly and rearwardly through the passageway before exiting the seed tube 46 at the lower egress end 43. The seed tube 46 may include hooks or mounting ears as is conventional for mounting to the shank 30 and/or other mounting points of the row unit frame 16.

Although the sensor 100 is preferably positioned at the egress end 43 of seed tube 46 to better reflect the in-furrow seed-to-seed placement as described above, the sensor 100 may be located anywhere along the passageway of the seed tube 46. It should also be appreciated that the configuration of the sensor 100 may also vary depending on the configuration of the seed tube and the position and spacing between the furrow opening discs (or disc depending on the make and model of planter), as well as other factors associated with the planter.

FIG. 7 shows an exploded perspective view of the sensor 100. The sensor 100 preferably includes an access cover 110, a lead 120, a connector 130, circuitry 150, a liner 160, and a housing 170 within which is received the liner 160 and circuitry 150.

The circuitry 150 includes a transmitter 152, a detector 154 and a circuit board 156. The transmitter 152 and detector 154 preferably comprising copper electrodes mounted to the substrate of the circuit board 156. U.S. Pat. Nos. 6,208,255 and 6,346,888, previously incorporated herein by reference, disclose the circuitry incorporated into the circuit board 156. As will become apparent, when the sensor 100 is assembled, the transmitter 152 and detector 154 are disposed on either side of the liner 160 and within housing 170 so as to detect the seeds passing therebetween.

As best illustrated in FIGS. 8A-8D, the liner 160 is preferably formed of plastic or other suitable material and includes sidewalls 161, 162 and front and rear walls 163, 164 which together define a through opening 166 through which the seeds will pass upon exiting the end of the seed tube 46. The through opening 166 of the liner 160 is preferably configured and sized so as not to obstruct or interfere with the trajectory of the seeds exiting the egress end 43 of the seed tube 46. The exterior of the sidewalls 162 preferably include guides 168 which slideably receive the transmitter 152 and detector 154. The liner 160 further includes a boss 167 for receiving a threaded connector for securing the circuit board 156 thereto. The exterior of the sidewalls 162 also preferably include spacers 169 the purpose of which will be described later.

Figure 6:
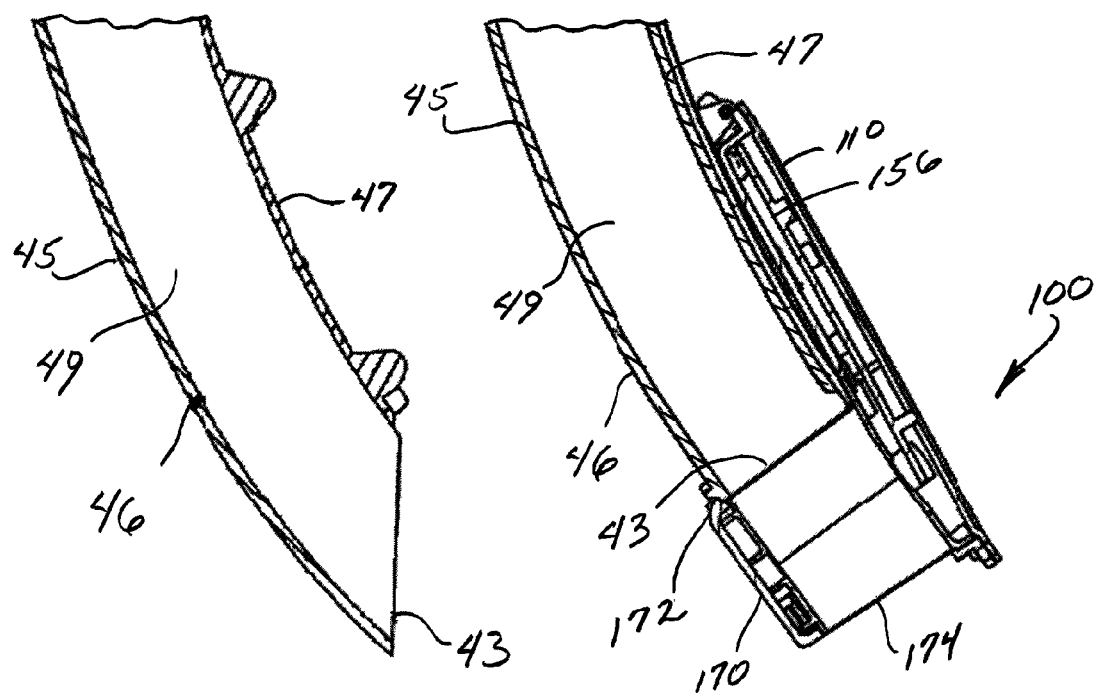
FIG. 6 is a side-by-side comparison of a conventional seed tube and the same conventional seed tube as modified with the electromagnetic seed sensor mounted at the end thereof.
Figure 9A:
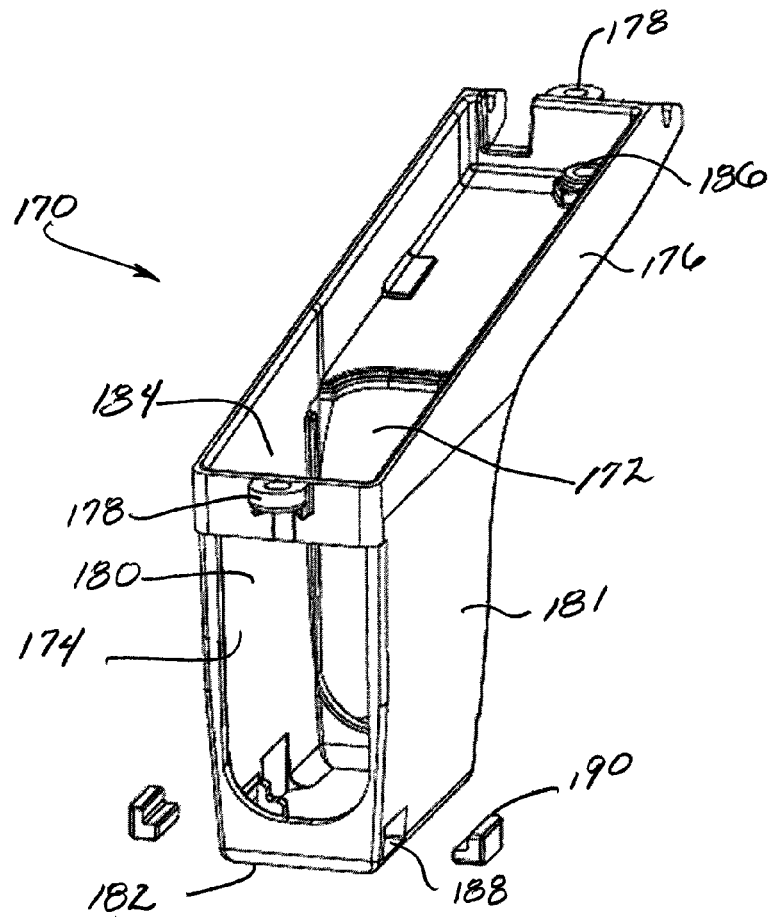
FIG. 9A is a perspective view of the housing of the electromagnetic sensor of FIG. 3.
Figure 9B:
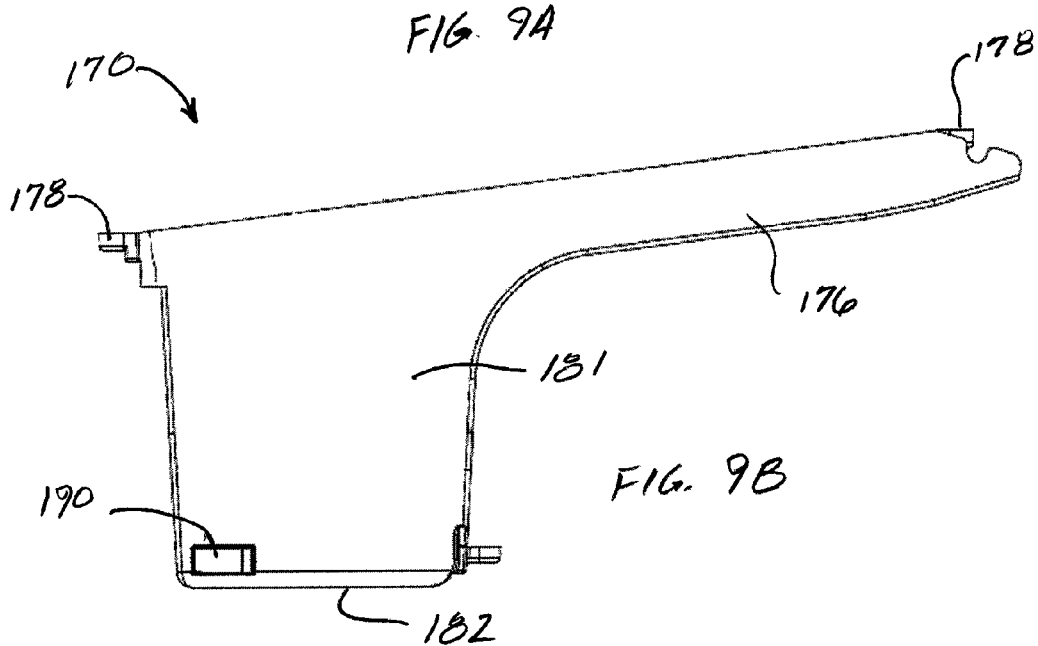
FIG. 9B is a side elevation view of the housing of the electromagnetic sensor of FIG. 9A.

As shown in FIGS. 9A and 9B, the housing 170 includes a top opening 172 and a bottom opening 174. As best illustrated in FIG. 6, the top opening 172 is sized and configured to receive the bottom end of the seed tube 46 without obstructing the opening of the seed tube so as not to interfere with the trajectory of the seed as it exits the seed tube. The bottom opening 174 is also configured so as not to interfere with the trajectory of the seed as it exits the seed tube. The housing 170 further preferably includes an upper leg 176 configured to receive the upper portion of the circuit board 156 and to align with the rearward wall 47 of the seed tube 46. Ears 178 are preferably formed in the upper leg 176 for receiving a threaded fasteners for securing the access cover 110 thereto. The housing 170 further includes side walls 180, 181 and a front wall 182 which define a cavity 184 sized and configured to received the liner 160 and circuitry 150. A boss 186 is preferably formed within the upper leg 176 for securing the circuit board 156 thereto with a threaded fastener. The sidewalls 180 of the housing 170 preferably include sockets 188 for receiving wear inserts 190 positioned where the furrow opening discs 22, 24 are likely to contact or rub against the housing 170 during planting operations. The wear inserts are preferably made of a relatively hard wear-resistant material such as tungsten carbide or other suitable wear resistant material.

The cover 110 includes ears 112 which mate with the ears 178 in the housing 170 for securing by threaded fasteners thereby enclosing the circuitry 150. Preferably, before the cover 110 is secured to the housing 170, a non-conducting gel (not shown), such as epoxy or other potting compounds as are known in the art, is poured over the circuitry 150 filling the interior volume between the cover 110 and circuit board 156 and between the housing 170 and liner 160 to protect the sensor circuitry from moisture and impact.

In operation, the sensor 100 generates electromagnetic energy at the transmitter 152 which is received by the detector 154 disposed on the opposite wall of the liner 160 between which is the through opening 166 through which the seed passes as it exits the seed tube 46. The transmitter 152 is preferably a sine wave generator, the design of which is familiar to those skilled in the art, such as an oscillator as disclosed in the '255 and '888 patents. The electromagnetic energy generated by the transmitter 152 is detected at the detector 154 using an element incorporated in the circuit board 156, such as a mixer model ADEX-10L+ also available from Mini-Circuits Fort Wayne LLC. The circuit board 156 generates an output signal related to the magnitude and phase of electromagnetic energy detected at the detector 154. The output signal is communicated through lead 120 and connector 130 to a planter monitor (not shown) having a processing module. The circuit board 156 preferably draws power through lead 120 and connector 130 from a power supply, such that lead 120 preferably comprises a harness containing electrical connections for transmitting signals from the sensor 100 and for transmitting power to the sensor 100.

When seeds pass through the through opening 166 and between the transmitter 152 and the detector 154, the output signal generated by circuit board 156 is modified because the seed perturbs the electromagnetic energy detected by the detector 154. This variation may be used by a planter monitor or similar systems to record the time at which each seed has been released as is well known in the art and therefore does not warrant further description here.

The perturbation in the electromagnetic energy caused by a seed passing between the transmitter 152 and detector 154 is distinguishable from the perturbation caused by dust or other particles because the variation in signal caused by a dust will be smaller than that of a seed which has a much larger dielectric mass. Thus, the sensor 100 can clearly and accurately distinguish between seeds, dust and other particulate matter and is therefore capable of being used in environments such as at the egress end of the seed tube, where an optical sensor would not be capable of functioning accurately. For example, with an optical sensor, a plume of dust may cause a comparable light obstruction to a seed and cause erroneous readings by an optical sensor. Additionally, the sensor 100 has no sensitivity to increased ambient light near the bottom of the seed tube as does an optical sensor.

While the sensor 100 has advantages over an optical sensor as described above and therefore may be placed at or near the egress end of the seed tube between the furrow opening discs 22, 24, certain factors must be taken into consideration when placing an electromagnetic generator near or between electrically conductive opening discs 22, 24. Because each opening disc 22, 24 constitutes a moving conductor, the presence of the magnetic field causes eddy currents to form in the opening discs. Each such eddy current induces a magnetic field tending to oppose the field that created it. Thus the rotation of nearby furrow opening discs 22, 24 will cause secondary magnetic fields that are received by the detector 154, resulting in significant interference in the signal produced by the sensor 100. Experimental data have shown that when the detector 154 is located near the bottom of the seed tube 46 and within approximately one centimeter of either of the inner surfaces of opening discs 22, 24, eddy currents interfere with sensor operation.

Thus, the transmitter 152 and detector 154 are preferably magnetically shielded by a structure having a relative permeability preferably between the ranges of about 100 to 10,000, but preferably the relative permeability is around 600. Such relative permeability may be achieved by making the housing 170 out of ferromagnetic materials such as iron, cobalt or nickel, or from an alloy such as mu-metal, permendur, permalloy, steel, alfenol or rhometal. The high effective permeability is particularly important in the lateral sidewalls 180, 181 of the housing because the lateral sidewalls are disposed between the opening discs 22, 24 and the transmitter and receiver 152, 154. With such external shielding in place, the magnetic field generated by transmitter 152 is prevented from reaching the opening discs 22, 24 (and thus prevented from forming eddy currents in the opening discs), and any external magnetic fields are prevented from reaching the detector 154.

Figure 8A:
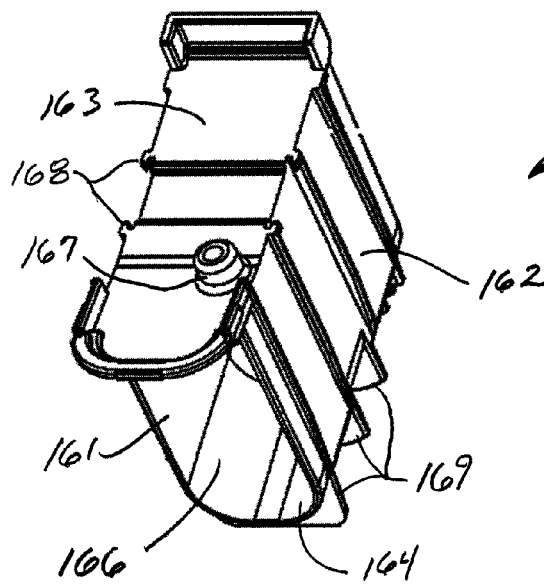
FIG. 8A is a perspective view of the liner of the electromagnetic sensor of FIG. 3.
Figure 8C:
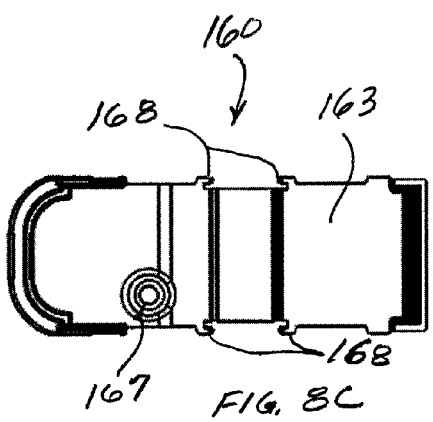
FIG. 8C is a top plan view of the liner of FIG. 8B.
Figure 8D:
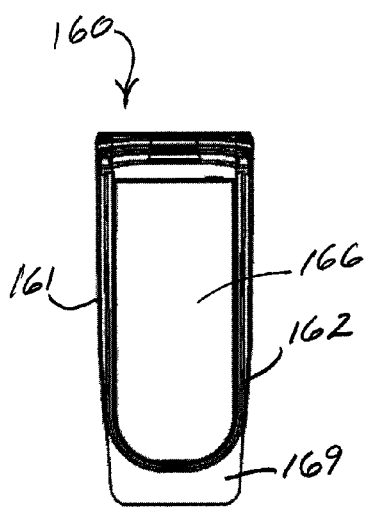
FIG. 8D is a left side elevation view of the liner of FIG. 8B.
Figure 8B:
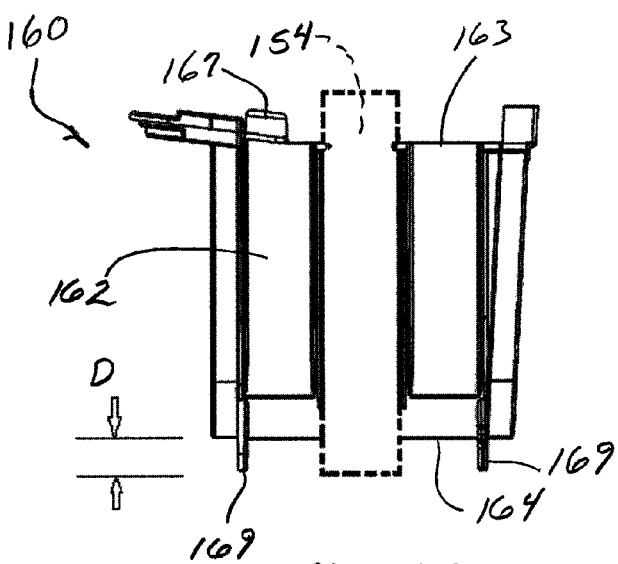
FIG. 8B is a side elevation view of the liner of FIG. 8A.

Experimental data have shown that the sensitivity of the detector 154 is reduced near the distal and proximal ends of the detector furthest from the circuit board 156. Thus, as best seen in FIG. 8B, the lower surface of the liner 160 is preferably separated by a distance D from the interior surface of housing 170, while the detector 154 and transmitter 152 continue past the lower surface of the liner 160 toward the inner surface of housing 170. Thus, as may be observed in FIG. 8B, seeds do not pass by the less sensitive distal or proximal send of detector 154. Because the lower surface of liner 160 does not contact the housing 170, the spacers 169 serve to contact the housing and hold the liner in place.

An additional advantageous function of the liner 160 is that the guides 168 prevent substantial deflection of the transmitter 152 and detector 154, as best illustrated in FIG. 8B. Experimental data have shown that deflection of either the transmitter or detector can interfere with the signal produced by the sensor 100. The gel (not shown) filling the interior volume between the housing 170 and liner 160 also limits deflection of the transmitter 152 and detector 154. It will be appreciated that the same function may be accomplished by any suitable means preventing deflection of the transmitter 152 or the detector 154.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but is to be accorded the widest scope consistent with the spirit and scope of the appended claims.

The invention claimed is:

1. A seed sensor for an agricultural planter, comprising: an electromagnetic energy sensor disposed at or below an egress end of a seed tube through which seeds pass during planting operations, said electromagnetic energy sensor capable of generating an output signal corresponding to the passage of seed therethrough.

2. The seed sensor of claim 1 wherein said electromagnetic energy sensor includes a transmitter that generates an electromagnetic field and a detector for detecting said generated electromagnetic field, and wherein the seeds pass through the generated electromagnetic field during planting operations.

3. The seed sensor of claim 2 wherein said electromagnetic energy sensor further includes a magnetic shield.

4. The seed sensor of claim 3 wherein said magnetic shield has relative permeability greater than about 100.

5. The seed sensor of claim 4 wherein said electromagnetic energy sensor is further disposed adjacent at least one furrow opening disc.

6. The seed sensor of claim 5 wherein said magnetic shield is disposed between said transmitter and the at least one furrow opening disc.

7. The seed sensor of claim 5 wherein said at least one furrow opening disc comprises a pair of furrow opening discs arranged to diverge outwardly and upwardly away from a soil surface and a direction of travel of the planter, said egress end of said seed tube disposed between said outwardly and upwardly diverging discs and said electromagnetic energy sensor disposed between said outwardly and upwardly diverging discs and proximate the soil surface.

8. The seed sensor of claim 7 wherein said generated electromagnetic field is below an egress end of said seed tube.

9. The seed sensor of claim 2 wherein said generated electromagnetic field is below an egress end of said seed tube.

10. A method of detecting seeds proximate an egress end of a seed tube through which seeds pass during planting operations, said method comprising:
generating an electromagnetic field at or below the egress end of the seed tube, the egress end of the seed tube disposed proximate a soil surface, the seeds passing through the generated electromagnetic field during planting operations; and
generating an output signal corresponding to the passage of seed through said generated electromagnetic field.

11. The method of claim 10 wherein the egress end of the seed tube is further disposed proximate at least one furrow opening disc.

12. The method of claim 11 further comprising shielding said generated electromagnetic field from said at least one furrow opening disc.

13. The method of claim 12 wherein said shielding is provided by disposing a material having a high relative permeability between said generated electromagnetic field and said at least one furrow opening disc.

14. The method of claim 13 wherein said high relative permeability is greater than about 100.

15. The method of claim 11 wherein said at least one furrow opening disc comprises a pair of furrow opening discs arranged to diverge outwardly and upwardly away from the soil surface and a direction of travel of the planter, the egress end of the seed tube disposed between said outwardly and upwardly diverging discs.

16. The method of claim 10 wherein said generated electromagnetic field is below the egress end of the seed tube.

17. An electromagnetic energy sensor for detecting the passage of seeds through a seed tube during planting operations, the sensor comprising:
a housing disposed at or below an egress end of the seed tube, said housing having a through opening through which the seeds pass during planting operations;
a transmitter disposed within said housing, said transmitter generating an electromagnetic field through which the seeds pass during planting operations; and
a detector disposed within said housing, said detector detecting the generated electromagnetic field and generating an output signal corresponding to the passage of seed through the generated electromagnetic field.

18. The electromagnetic energy sensor of claim 17 wherein the egress end of the seed tube is disposed proximate a soil surface and adjacent at least one furrow opening disc.

19. The electromagnetic energy sensor of claim 18 wherein said housing has a relative permeability greater than about 100 so as to shield said generated electromagnetic field from said at least one furrow opening disc.

20. The electromagnetic energy sensor of claim 17 wherein the egress end of the seed tube is disposed proximate a soil surface and between a pair of furrow opening discs diverging outwardly and upwardly away from the soil surface and a direction of travel of the planter.

21. The electromagnetic energy sensor of claim 20 wherein said housing has a relative permeability greater than about 100 so as to shield said generated electromagnetic field from said pair of furrow opening discs.

\* \* \* \* \*